(12) United States Patent
Wall et al.

(10) Patent No.: US 7,151,480 B2
(45) Date of Patent: Dec. 19, 2006

(54) METHOD AND SYSTEM OF TRIANGULATING AN OBJECT

(75) Inventors: Per Wall, Gothenburg (SE); Mikael Jeppsson, Molndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

(21) Appl. No.: 11/027,686

(22) Filed: Jan. 3, 2005

(65) Prior Publication Data

US 2005/0174287 A1   Aug. 11, 2005

Related U.S. Application Data

(63) Continuation of application No. PCT/SE02/01336, filed on Jul. 3, 2002.

(51) Int. Cl.
| | |
|---|---|
| G01S 5/04 | (2006.01) |
| G01S 13/08 | (2006.01) |
| G01S 3/02 | (2006.01) |
| G01C 19/72 | (2006.01) |
| G01B 11/24 | (2006.01) |
| G01B 11/30 | (2006.01) |

(52) U.S. Cl. ................ 342/126; 342/450; 356/463; 367/118

(58) Field of Classification Search ............... 342/125, 342/450; 356/463; 367/118
See application file for complete search history.

(56) References Cited

U.S. PATENT DOCUMENTS 4,899,161 A   2/1990   Morin, Jr. et al.
5,583,517 A   12/1996   Yokev et al.

FOREIGN PATENT DOCUMENTS

WO   WO2004005955 A1 *  1/2004

* cited by examiner

*Primary Examiner*—Dan Pihulic
(74) *Attorney, Agent, or Firm*—Nixon & Vanderhye P.C.

(57) ABSTRACT

A method and a system of triangulating an object by means of at least two sensors. Each sensor is placed in a respective local reference system. Each of the at least two sensors at least provide a bearing to the object in their respective local reference system. According to the invention a triangulation reference system is created. The triangulation reference system is different to any one of the local reference systems and suitably such that at least two local reference systems are rotated more in relation to each other than each one is in relation to the triangulation reference system. Sensor positions and bearings are transformed into the triangulation reference system where the triangulation is performed. Suitably the triangulated position is then transformed into a desired reference system.

20 Claims, 3 Drawing Sheets

METHOD AND SYSTEM OF TRIANGULATING AN OBJECT

This application is a continuation of international application PCT/SE2002/001336 filed Jul. 3, 2002 which designated the U.S. The entire content is hereby incorporated by reference.

TECHNICAL FIELD

The invention concerns triangulation and is more particularly directed to the attained accuracy when triangulating an object by means of at least two bearings, especially when the bearings are expressed in different reference systems.

BACKGROUND

Triangulation is a traditional and popular method of attaining the coordinates of an object by the use of usually two or more sensors. Sensors used for triangulation need only give a bearing to the object, the distance being the unknown variable. The sensors can either be active, i.e. irradiate the object with for example electromagnetic radio waves that reflect off the object for detection, or more usually be passive, i.e. the sensors rely on being able to detect a bearing to an object by emissions of the object such as radio waves emitted by a mobile telephone. The traditional use of triangulation has been to locate illegal radio transmitters for pirate radio stations. Currently triangulation can be used in an even greater variety of applications, such as finding lost people by means of a turned-on mobile telephone.

The commonly at least two sensors used, each give a bearing/measurement to the object in question. The given bearing from each sensor is related to the location and most importantly the orientation of each respective sensor, i.e. bearings from a sensor are related to the spatial location and orientation of the sensor. Usually the sensor is at the origin of a polar coordinate system, where a bearing is related to some coordinate axis. Each sensor thus has its own coordinate system, or rather its own reference system. To easily be able to use the bearings from more than one sensor it is desirable that the sensors are related to a single reference system. Unfortunately the surface of the earth has a definite curvature, making the likelihood very small that the reference systems of two sensors that are widely spaced will coincide. It is most likely that the reference systems of two different sensors are both revolved and rotated in relation to each other.

If the sensors are close to each other, in the range of a few kilometers, then the curvature of the earth is commonly ignored and the reference systems of the different sensors are considered to coincide. The resulting errors are usually relatively small in relation to other error sources. On the other hand, if the sensors are further apart, it is no longer possible to ignore the problems that are incurred by different reference systems. Methods to take this into account usually involve approximating the curved surface by geometrical algorithms such that it can be considered flat by the introduction of a map system. Map systems will usually also take into account any meridional convergence by means of the algorithms. Unfortunately the use of a map system will introduce errors in dependence on how good the different approximations are. For example, densely populated areas will usually have very good map systems, because a lot of effort has been put into them, while on the other hand thinly populated areas, where it is likely for people to get lost, might have very poor approximations of the earth's curvature, if the area is covered by the map system at all. There still exists room for improvement of triangulation systems.

SUMMARY

An object of the invention is to define a method and a system of triangulation.

A further object of the invention is to define a method and a system of triangulation which is not dependent on any map system.

The aforementioned objects are achieved according to the invention by a method and a system of triangulating an object by means of at least two sensors. Each sensor is placed in a respective local reference system. Each of the at least two sensors at least provide a bearing to the object in their respective local reference system. According to the invention a triangulation reference system is created. The triangulation reference system is different to any one of the local reference systems and suitably such that at least two local reference systems are revolved and rotated more in relation to each other than each one is in relation to the triangulation reference system, i.e. there is more rotation and revolving involved to make the at least two local reference systems coincide, than there is for any of the local reference systems to coincide with the triangulation reference system. Sensor positions and bearings are transformed into the triangulation reference system where the triangulation is performed. Suitably the triangulated position is then transformed into a desired reference system.

The aforementioned objects are further achieved according to the invention by a method of triangulating an object by means of at least two sensors. Each sensor is placed in a respective local reference system. Each of the at least two sensors at least provide a bearing to the object in their respective local reference system. According to the invention the method comprises a plurality of steps. In a first step a triangulation reference system is determined. In a second step a triangulation transformation matrix is calculated from each sensor's local reference system to the triangulation reference system. In a third step, for each sensor used, at least a bearing to the object in a respective local reference system is determined. In a fourth step, for each determined bearing to the object in a respective local reference system, a corresponding bearing in the triangulation reference system is calculated by means of a corresponding calculated triangulation transformation matrix. And finally in a fifth step the object is triangulated in the triangulation reference system by means of the calculated bearings in the triangulation reference system.

Preferably the first step which determines a triangulation reference system, determines a triangulation reference system that is at least substantially symmetrically oriented between the local reference systems of the sensors, in such a way that at least two local reference systems are rotated more in relation to each other than each one is in relation to the triangulation reference system. Suitably the local reference systems are defined by the geographical location of each respective sensor, in such a way that a plane of each respective local reference system is perpendicular to a normal of the surface where each respective sensor is located. To improve performance of the system it is advantageous that the first step, which determines a triangulation reference system and the second step, which calculates a triangulation transformation matrix from each sensor's local reference system to the triangulation reference system, are performed when a local reference system of at least one of the sensors change.

Sometimes the relationships between the triangulation reference system and each of the local reference systems are all known. At other times the triangulation reference system and each of the local reference systems are all known in relation to a common reference system. Then the second step, which calculates the triangulation transformation matrices, uses the common reference system to determine the relationship between the triangulation reference system and each one to the local reference systems. The second step can alternatively, when calculating the triangulation transformation matrices use the common reference system to determine the transformation matrices. Accordingly, transformation matrices to and from the common reference system in relation to the triangulation reference system and each one of the local reference systems are first calculated, from which matrices the triangulation transformation matrices from each sensor's local reference system to the triangulation reference system are calculated.

In some situations the sensors only provide a bearing and/or the triangulation only takes into account provided bearings, then suitably the triangulation reference system and each one of the local reference systems are planes. Then suitably the second step, which calculates the triangulation transformation matrices from each sensor's local reference system to the triangulation system and the fourth step, which calculates a corresponding bearing in the triangulation reference system, involves a plane projection of each sensor location and determined bearing to the object from each respective local reference system to the triangulation reference system. In some versions at least one of the sensors provide an elevation to the object, and then the triangulation reference system and at least the local reference systems of the sensor that provides the elevation are suitably three dimensional reference systems, and then a height of the object in the triangulation reference system is suitably determined when the object has been triangulated.

In some versions each of the sensors provide a bearing and an elevation, and then the triangulation reference system and each one of the local reference systems are suitably three dimensional reference systems. Then the fifth step, which triangulates the object in the triangulation reference system by means of the calculated bearings in the triangulation reference system, uses uncertainty cones about each calculated bearing for the triangulation of the object.

Advantageously, in some versions of the method of triangulating an object according to the invention further comprises additional steps. In a first additional step an object transformation matrix from the triangulation reference system to an object reference system is calculated. In a second additional step a position of the triangulated object in the triangulation reference system is transformed to a position of the triangulated object in the object reference system by means of the calculated object transformation matrix. The object reference system can suitably be a reference system of e.g. a search party.

One or more of the features of the above-described different methods according to the invention can be combined in any desired manner, as long as the features are not contradictory.

The aforementioned objects are also achieved according to the invention by a system arranged to triangulate an object by means of at least two sensors. Each sensor is placed in a respective local reference system. Each of the at least two sensors at least provide a bearing to the object in their respective local reference system. According to the invention the system comprises a plurality of means. A first means is arranged to determine a triangulation reference system. A second means is arranged to calculate a triangulation transformation matrix from each sensor's local reference system to the triangulation reference system. A third means is arranged, for each sensor used, to determine at least a bearing to the object in a respective local reference system. A fourth means is arranged, for each determined bearing to the object in a respective local reference system, to calculate a corresponding bearing in the triangulation reference system by means of a corresponding calculated triangulation transformation matrix. A fifth means is arranged to triangulate the object in the triangulation reference system by means of the calculated bearings in the triangulation reference system.

Suitably, in some embodiments the first means, which is arranged to determine a triangulation reference system, determines a triangulation reference system that is at least substantially symmetrically oriented between the local reference systems of the sensors, in such a way that at least two local reference systems are rotated more in relation to each other than each one is in relation to the triangulation reference system. Suitably the local reference systems are defined by the geographical location of each respective sensor, in such a way that a plane of each respective local reference system is perpendicular to a normal of the surface where each respective sensor is located. Sometimes the second means, which is arranged to calculate the triangulation transformation matrices, uses a common reference system to determine the transformation matrices, whereby transformation matrices to and from the common reference system in relation to the triangulation reference system and each one of the local reference systems are first calculated, from which matrices the triangulation transformation matrices from each sensor's local reference system to the triangulation reference system are calculated.

In some embodiments the sensors only provide a bearing and/or the triangulation only takes into account provided bearings, and then the triangulation reference system and each one of the local reference systems are suitably planes. The second means, which is arranged to calculate the triangulation transformation matrices from each sensor's local reference system to the triangulation system and the fourth means, which is arranged to calculate a corresponding bearing in the triangulation reference system, involves a plane projection of each sensor location and determined bearing to the object from each respective local reference system to the triangulation reference system. Advantageously in some embodiments at least one of the sensors provide an elevation to the object, and then the triangulation reference system and at least the local reference systems of the sensor that provides the elevation are three dimensional reference systems, and in that a height of the object in the triangulation reference system is suitably determined when the object has been triangulated.

The system according to the invention can advantageously further comprise a number of additional means. A first additional means is arranged to calculate an object transformation matrix from the triangulation reference system to an object reference system. A second additional means is arranged to transform a position of the triangulated object in the triangulation reference system to a position of the triangulated object in the object reference system by means of the calculated object transformation matrix.

One or more of the features of the above-described different systems according to the invention can be combined in any desired manner, as long as the features are not contradictory.

By providing a method and a system of triangulation according to the invention a plurality of advantages over prior art methods and systems are obtained. A primary purpose of the invention is to remove any dependence of map systems that are only restricted to limited areas, a further purpose of the invention is to provide an increased overall accuracy. This is obtained according to the invention by introducing a triangulation reference system that is dynamically determined in view of the local reference systems of the used sensors. The triangulation reference system does not coincide with any of the local reference systems, but is chosen so that transformations to and from the triangulation reference system are approximately of the same magnitude in relation to any one of the local reference systems. This will keep transformation errors in the approximate same magnitude in relation to all of the local reference systems. Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 4B.

In different situations an estimation of for example a transmitter's currently unknown position is sought. Such situations can for example occur when trying to locate a radio transmitter. When directional information is used for estimating a position of a transmitter or a reflector, it is called triangulation.

Figure 1:
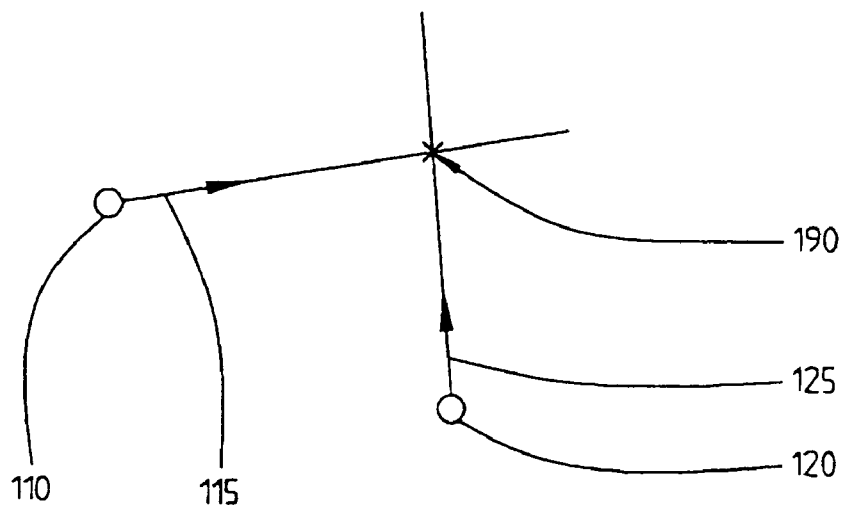
FIG. 1 illustrates the principles of triangulation.

FIG. 1 shows the principles of triangulating for example a transmitter located at an unknown position 190. Directional information 115, 125 of the transmitter, from two or more locations 110, 120 have to be used. By using the directional information 115, 125 from each location 110, 120, a position 190 for the transmitter can be determined. The directional information 115, 125 can be measurements from a sensor 110, 120 designed for measuring direction to a transmitter 190 of the type of interest.

Triangulation can roughly be divided into two basic types of triangulation. In a first type, triangulation is performed on non-moving, or slowly moving, transmitters/reflectors such as stationary radio transmitters. In a second type, triangulation is performed on moving transmitters/reflectors such as cars and airplanes. For triangulation of a non-moving transmitter it is possible to move a single sensor to different locations for collecting the directional information. But for a moving transmitter it is necessary to use several sensors at different locations to thereby obtain directional information at one single moment. It is necessary to have all measurements collected at the same moment, or at least during a small time span in relation to the rate of movement, to ensure that all collected directional information refer to the same position of origin. Had the measurements from the sensors been collected separated in time, a time large enough to allow a transmitter to move considerably, it would not be possible to estimate/determine the transmitter's position correctly.

Figure 2A:
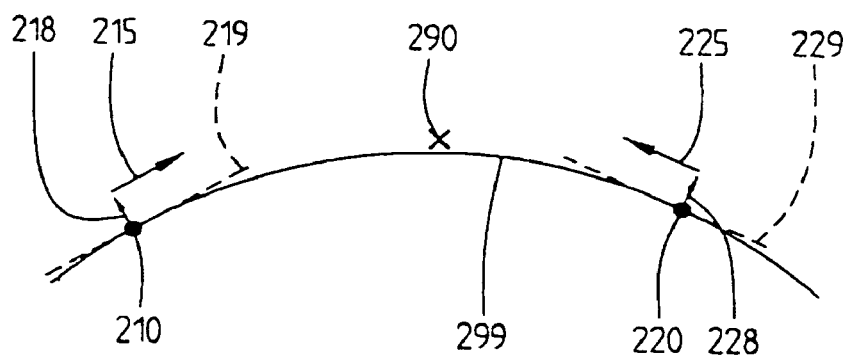
FIGS. 2A–2B illustrate a situation where two sensors in different reference systems have determined bearings to an object, side view and top view respectively.
Figure 2B:
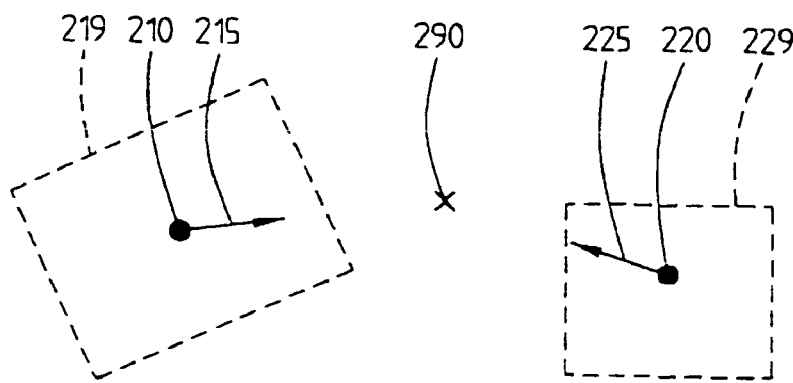

Sensors that contribute with directional information, direction measurements, for a triangulation, usually provide directional information that consists of an azimuth relative north, like a compass bearing. The measurements are however performed in each respective radar sensor's own relative coordinate system, reference system, as it is difficult if not completely impossible to make measurements in relation to any other reference system. FIGS. 2A and 2B illustrate a situation where two sensors 210, 220 in different reference systems 219, 229 have determined bearings 215, 225 to an object 290. Each bearing 215, 225 is related to each respective reference system 219, 229. FIG. 2A shows a side view, where the earth surface 299 is illustrated. FIG. 2B shows a top view. Local reference systems 219, 229 are usually defined from a normal 218, 228 at each respective sensor 210, 220 to the surface 299 where each respective sensor 210, 220 is located. If there is no elevation, then a two-dimensional reference system is sufficient, thus being a plane 219, 229, which is perpendicular to each respective normal 218, 228. As is evident from FIG. 2A the reference system planes 219, 229 are not parallel, and as is evident from FIG. 2B the reference systems 219, 229 are also rotated in relation to each other. This makes a triangulation difficult, since the attained bearings 215, 225 are expressed in different local reference systems 219, 229.

To overcome these difficulties, according to the invention, the measurements/bearings are converted to one and the same coordinate system/reference system. According to the invention a triangulation reference system is created, not coinciding with any of the local reference systems. The triangulation reference system is preferably an "average" between all of the participating local reference systems, i.e. the transformations to and from the triangulation reference system are to be as "small" as possible in relation to all of the participating reference systems, in the sense that any necessary revolving and/or rotation involved are to be kept as small as possible. To be noted is that even if a system has 20 sensors, each with its own local reference system, not all of these 20 might be participating in a triangulation of an object, for example due to malfunction, not being able to detect an object in question, or being involved in tracking/detecting another object. These unused sensor's local reference systems should usually not be allowed to influence the choice of triangulation reference system, only the participating ones. After converting/transforming the bearings/measurements to the triangulation reference system it is possible to triangulate an object's position. The determined/calculated/estimated position can then be transformed into a desired reference system, e.g. back to one of the contributing sensors' local reference systems, or a completely different reference system.

Figure 3A:
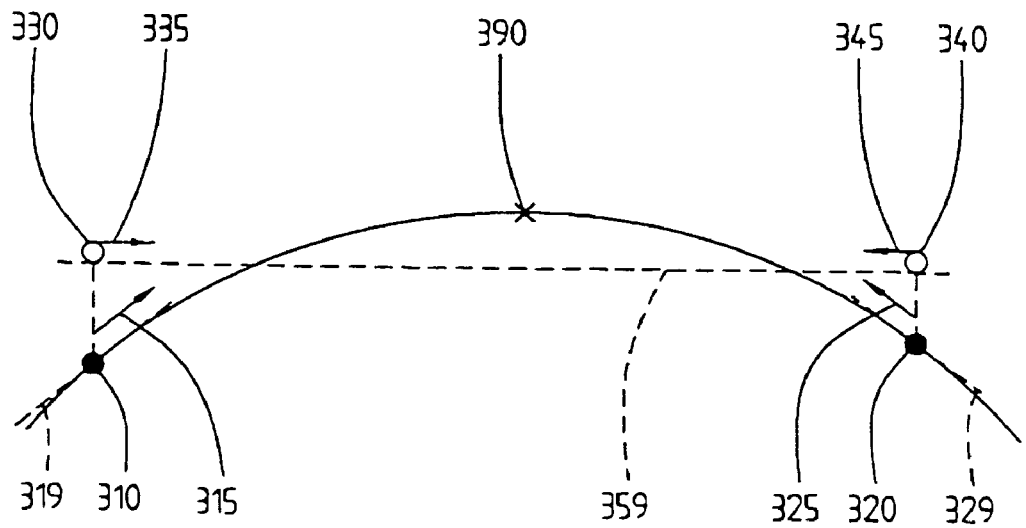
FIGS. 3A–3B illustrate an example of triangulation, in a side view and a top view respectively, according to the invention in a situation such as that depicted in FIGS. 2A and 2B.
Figure 3B:
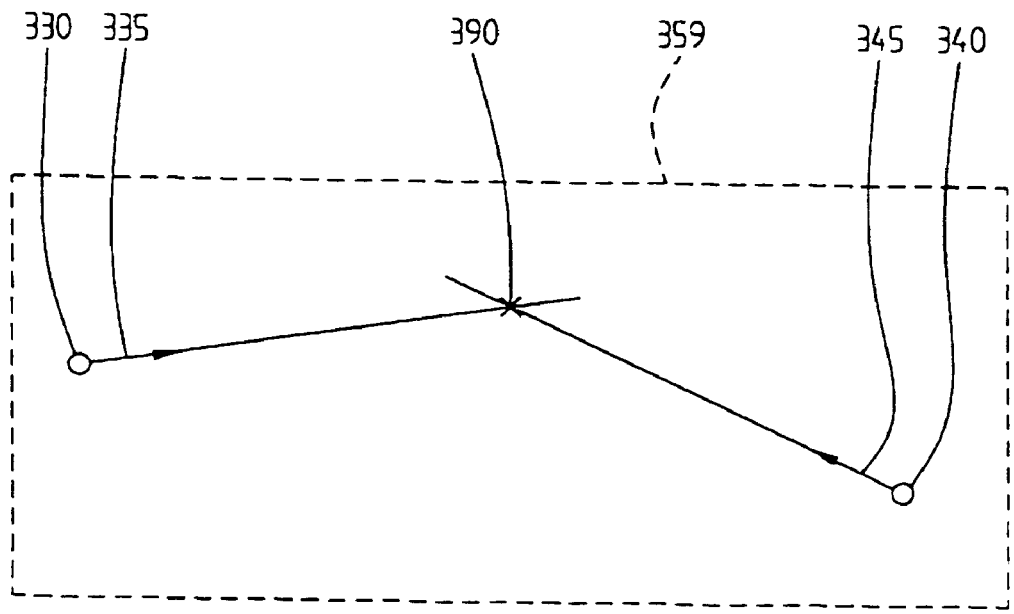

FIGS. 3A and 3B illustrate an example of triangulation, in a side view and a top view respectively, according to the invention in a situation such as that which is depicted in FIGS. 2A and 2B with two sensors 310, 320 oriented in a respective local reference system 319, 329. The sensors 310, 320 have detected and determined respective bearings 315, 325 to an object 390. According to the invention a triangulation reference system 359 is created, in this example it is simply a plane since there is no elevation involved, at least not at this stage. The triangulation reference system 359 is determined in relation to the participating sensors' 310, 320 respective local reference systems 319, 329. As is shown in FIG. 3A, a plane projection of the sensors 310, 320 and their bearings 315, 325 towards the object 390 from each respective local reference system 319, 329 onto the triangulation reference system 359 is calculated resulting in sensor locations 330, 340 and respective bearings 335, 345 on the triangulation reference system 359. As is shown in FIG. 3B, once bearings 335, 345 are in a same reference system, then triangulation of the object 390 is straight forward. An attained triangulated position 390 of an object can then be transformed back to one of the local reference systems 319, 329, or be transformed to another reference system, for example a reference system of a search party.

Figure 4A:
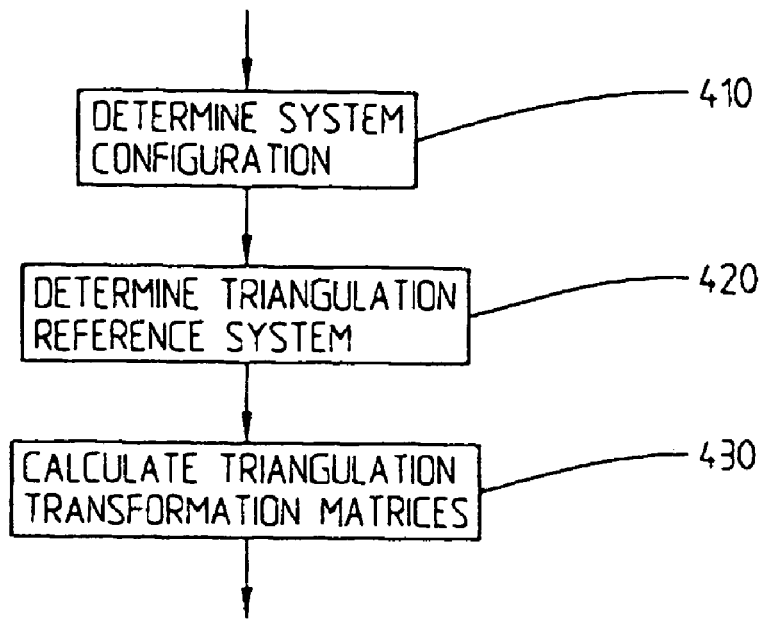
FIG. 4A illustrates a first part of a flow diagram according to the invention.
Figure 4B:
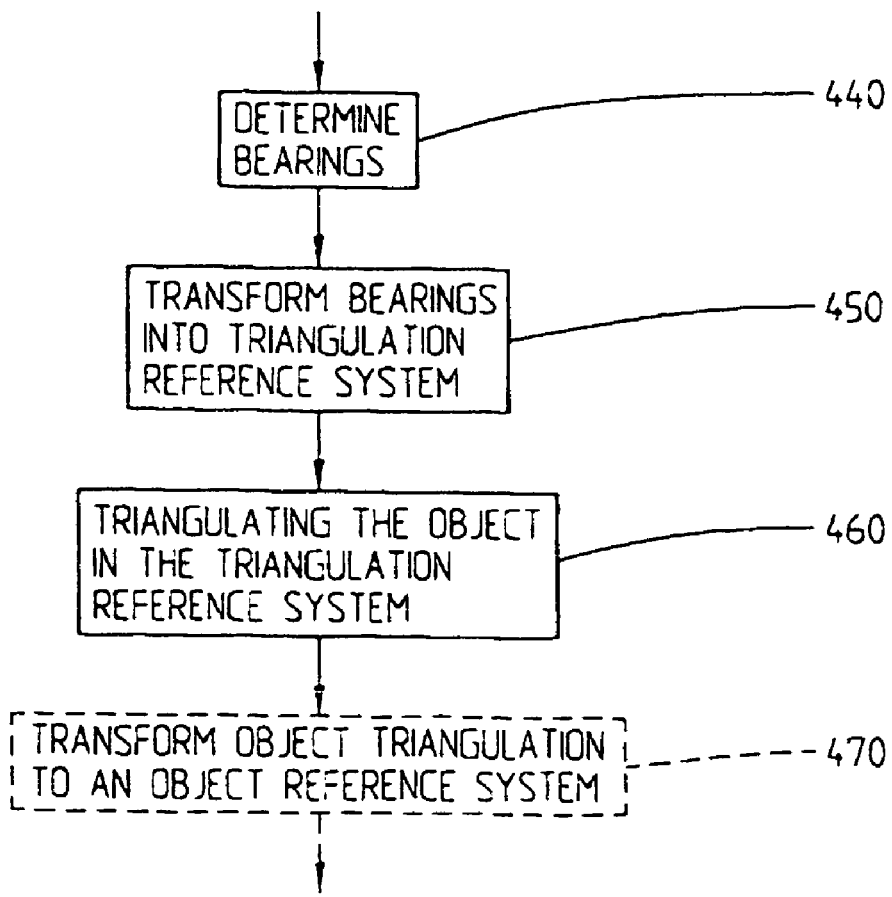
FIG. 4B illustrates a second more repetitive part of a flow diagram according to the invention.

FIGS. 4A and 4B illustrate flow diagrams of a method of triangulation according to the invention. FIG. 4A illustrates a first part of the flow diagram according to the invention, which part does not necessarily have to be performed for every triangulation made. The first part of the flow diagram concerns setting up a triangulation system according to the invention. If one or more characteristics of the system change, then this first part most likely has to be performed again. A first step 410 determines a current system configuration, i.e. what sensors are a part of the triangulation and what reference systems do they have. As an option, if there are no changes to the configuration that implies that a new triangulation reference system has to be determined or the triangulation transformation matrices has to be recalculated, then the respective second 420 and the third 430 steps can be skipped alone or in combination. After the first step 410, a second step 420 determines a triangulation reference system in dependence of the participating sensors' reference systems. The triangulation reference system, or plane in a two-dimensional triangulation, is determined such that any necessary revolving and/or rotation in respect of attaining coincidence with the local reference systems, or planes, are numerically kept as small as possible. This is to keep transformation matrices, which transform coordinates between the triangulation reference system and each of the local reference systems, as simple as possible to thereby minimize transformation errors. After the second step 420, a third step 430 calculates triangulation transformation matrices based on the determined triangulation reference system and the participating sensors' reference systems.

In the following is an example, based on using a common base reference system, such as the WGS 84 XYZ, to show how the triangulation transformation matrices can be calculated.

In a first equation, a point X is transformed between a sensor k's local reference system and the common base reference system: $X=O_k+P_k \cdot X_k$. Where X is a point $\{x, y, z\}$ defined in the common base reference system. Where $X_k$ is a point $\{x_k, y_k, z_k\}$ defined in sensor k's local reference system. Where $O_k$ is the origin of coordinates of sensor k's local reference system in the common base reference system $\{x_{ok}, y_{ok}, z_{ok}\}$. And where $P_k$ is a transformation matrix, a [3×3] matrix, to transform a point $X_k$ defined in sensor k's local reference system to the common base reference system.

In a second equation, a point X is transformed between the triangulation reference system and the common base reference system: $X=O_r+P_r \cdot X_r$. Where X is a point $\{x, y, z\}$ defined in the common base reference system. Where $X_r$ is a point $\{x_r, y_r, z_r\}$ defined in the triangulation reference system. Where $O_r$ is the origin of coordinates of the triangulation reference system in the common base reference system $\{x_{or}, y_{or}, z_{or}\}$. And where $P_r$ is a transformation matrix, a [3×3] matrix, to transform a point $X_r$ defined in the triangulation reference system to the common base reference system.

In a third equation, a point X is transformed between the common base reference system and the triangulation reference system: $X_r=P_r^t(X-O_r)$. Where $P_r^t$ is the transpose of $P_r$.

In a fourth equation, the first and the third equations are brought together to form: $X_r=P_r^t \cdot P_k \cdot X_k+P_r^t(O_k-O_r)$. The different transformation matrices P are calculated according to the flowchart as described above. Returning to a local reference system from the triangulation reference system, can be according to a fifth equation: $X_k=P_k^t \cdot P_r(X_r-P_r^t(O_k-O_r))$.

Bearings are preferably transformed as directional vectors in a manner similar to the above described example. Further if the reference systems are planes, i.e. we are transforming by means of plane projection, then any contribution by the Z-axis, height, is not considered.

FIG. 4B illustrates a second usually more repetitive part of the flow diagram of a method according to the invention. After the third step 430, a fourth step 440 determines bearings to an object at each of the participating sensors. This can be done in a variety of ways, either passively, i.e. detecting an object which emits something detectable, or actively, i.e. detecting reflections of an object being radiated by, for example, radar waves. After the fourth step 440, a fifth step 450 transforms the determined bearings into the triangulation reference system by means of the calculated transformation matrices and equations. After the fifth step 450, a sixth step 460 triangulates the object in the triangulation reference system, i.e. determines the object's coordinates in triangulation reference system or plane. Optionally after the sixth step 460, an optional seventh step 470 transforms the triangulated object, i.e. the object's coordinates, to an object reference system, such as one of the sensors' reference systems or another reference system.

The invention is based on the basic inventive idea of creating a triangulation reference system which is close, with regard to rotation and revolving, to all of the used sensors' local reference systems. By using the triangulation reference system triangulation is made independent of map approximation systems, and due to the placement of the triangulation reference system, so to speak in between the local reference systems, introduction of errors are kept as small as possible during transformations. The invention is not restricted to the above-described embodiments, but may be varied within the scope of the following claims.

FIG. 1—illustrates the principles of triangulation,
110 a first sensor,
115 a determined bearing from the first sensor towards an object,
120 a second sensor,
125 a determined bearing from the second sensor towards the object,
190 the object in question.
FIGS. 2A & 2B—illustrate a situation where two sensors in different reference systems have determined bearings to an object, side view and top view respectively,
210 a first sensor, 215 a determined bearing from the first sensor towards an object,
218 a normal defining a reference plane of the first sensor,
219 the reference plane of first sensor,
220 a second sensor,
225 a determined bearing from the second sensor towards the object,
228 a normal defining a reference plane of the second sensor,
229 the reference plane of second sensor,
290 the object in question,
299 an earth surface, "big hill".
FIGS. 3A & 3B—illustrate an example of triangulation, in a side view and a top view respectively, according to the invention in a situation such as that depicted in FIGS. 2A and 2B,
310 a first sensor,
315 a determined bearing from the first sensor towards an object,
319 a reference plane of the first sensor,
320 a second sensor,
325 a determined bearing from the second sensor towards the object,
329 a reference plane of the second sensor,
330 the first sensor's projection onto a triangulation reference system/plane,
335 the first sensor's determined bearing projected onto the triangulation reference system/plane,
340 the second sensor's projection onto the triangulation reference system/plane,
345 the second sensor's determined bearing projected onto the triangulation reference system/plane,
359 the triangulation reference system/plane,
390 the object in question.
FIG. 4A—illustrates a first part of a flow diagram according to the invention,
410 a first step of determining a current system configuration, i.e. which sensors are a part of the triangulation and what reference systems do they have,
420 after the first step: a second step of determining a triangulation reference system in dependence of the participating sensors' reference systems,
430 after the second step: a third step, which calculates triangulation transformation matrices based on the determined triangulation reference system and the participating sensors' reference systems.
FIG. 4B—illustrates a second, usually more repetitive part, of a flow diagram according to the invention,
440 after the third step: a fourth step of determining bearings to an object at each of the participating sensors,
450 after the fourth step: a fifth step of transforming the determined bearings into the triangulation reference system,
460 after the fifth step: a sixth step of triangulating the object in the triangulation reference system,
470 optionally after the sixth step: an optional seventh step of transforming the triangulated object, i.e. the object's coordinates, to an object reference system, such as one of the sensors' reference systems or another reference system.

The invention claimed is:

1. A method of triangulating an object by means of at least two sensors, each sensor being placed in a respective local reference system, each of the at least two sensors at least providing a bearing to the object in their respective local reference system, characterized in that the method comprises the steps of:
   determining a triangulation reference system;
   calculating a triangulation transformation matrix from each sensor's local reference system to the triangulation reference system;
   calculating an object transformation matrix from the triangulation reference system to an object reference system;
   for each sensor used, determining at least a bearing to the object in a respective local reference system;
   for each determined bearing to the object in a respective local reference system, calculating a corresponding bearing in the triangulation reference system by means of a corresponding calculated triangulation transformation matrix;
   triangulating the object in the triangulation reference system by means of the calculated bearings in the triangulation reference system, by
   transforming a position of the triangulated object in the triangulation reference system to a position of the triangulated object in the object reference system by means of the calculated object transformation matrix.

2. The method of triangulating an object according to claim 1, characterized in that the step of determining a triangulation reference system, determines a triangulation reference system that is at least substantially symmetrically oriented between the local reference systems of the sensors, in such a way that at least two local reference systems are rotated more in relation to each other than each one is in relation to the triangulation reference system.

3. The method of triangulating an object according to claim 1, characterized in that the local reference systems are defined by the geographical location of each respective sensor, in such a way that a plane of each respective local reference system is perpendicular to a normal of the surface where each respective sensor is located.

4. The method of triangulating an object according to claim 1, characterized in that the step of determining a triangulation reference system and the step of calculating a triangulation transformation matrix from each sensor's local reference system to the triangulation reference system, are performed when a local reference system of at least one of the sensors change.

5. The method of triangulating an object according to claim 1, characterized in that the relationships between the triangulation reference system and each of the local reference systems are all known.

6. The method of triangulating an object according to claim 1, characterized in that the triangulation reference system and each of the local reference systems are all known in relation to a common reference system.

7. The method of triangulating an object according to claim 6, characterized in that the step of calculation the triangulation transformation matrices uses the common reference system to determine the relationship between the triangulation reference system and each one to the local reference systems.

8. The method of triangulating an object according to claim 6, characterized in that the step of calculating the triangulation transformation matrices uses the common reference system to determine the transformation matrices, whereby transformation matrices to and from the common reference system in relation to the triangulation reference system and each one of the local reference systems are first calculated, from which matrices the triangulation transformation matrices from each sensor's local reference system to the triangulation reference system are calculated.

9. The method of triangulating an object according to claim 1, characterized in that the sensors only provide a bearing and/or the triangulation only takes into account provided bearings, and in that the triangulation reference system and each one of the local reference systems are planes.

10. The method of triangulating an object according to claim 9, characterized in that the step of calculating the triangulation transformation matrices from each sensor's local reference system to the triangulation system and the step of calculating a corresponding bearing in the triangulation reference system involves a plane projection of each sensor location and determined bearing to the object from each respective local reference system to the triangulation reference system.

11. The method of triangulating an object according to claim 9, characterized in that at least one of the sensors provide an elevation to the object, and in that the triangulation reference system and at least the local reference systems of the sensor that provides the elevation are three dimensional reference systems, and in that a height of the object in the triangulation reference system is determined when the object has been triangulated.

12. The method of triangulating an object according to claim 1, characterized in that each of the sensors provide a bearing and an elevation, and in that the triangulation reference system and each one of the local reference systems are three dimensional reference systems.

13. The method of triangulating an object according to claim 12, characterized in that the step of triangulating the object in the triangulation reference system by means of the calculated bearings in the triangulation reference system, uses uncertainty cones about each calculated bearing for the triangulation of the object.

14. A system arranged to triangulate an object by means of at least two sensors, each sensor being placed in a respective local reference system, each of the at least two sensors at least providing a bearing to the object in their respective local reference system, characterized in that the system comprises:
  means arranged to determine a triangulation reference system;
  means arranged to calculate a triangulation transformation matrix from each sensor's local reference system to the triangulation reference system;
  means arranged, for each sensor used, to determine at least a bearing to the object in a respective local reference system;
  means arranged to, for each determined bearing to the object in a respective local reference system, calculate a corresponding bearing in the triangulation reference system by means of a corresponding calculated triangulation transformation matrix;
  means arranged to triangulate the object in the triangulation reference system by means of the calculated bearings in the triangulation reference system, and
  means arranged to calculate an object transformation matrix from the triangulation reference system to an object reference system;
  means arranged to transform a position of the triangulated object in the triangulation reference system to a position of the triangulated object in the object reference system by means of the calculated object transformation matrix.

15. The system according to claim 14, characterized in that the means arranged to determine a triangulation reference system, determines a triangulation reference system that is at least substantially symmetrically oriented between the local reference systems of the sensors, in such a way that at least two local reference systems are rotated more in relation to each other than each one is in relation to the triangulation reference system.

16. The system according to claim 14, characterized in that the local reference systems are defined by the geographical location of each respective sensor, in such a way that a plane of each respective local reference system is perpendicular to a normal of the surface where each respective sensor is located.

17. The system according to claim 14, characterized in that the means arranged to calculate the triangulation transformation matrices uses a common reference system to determine the transformation matrices, whereby transformation matrices to and from the common reference system in relation to the triangulation reference system and each one of the local reference systems are first calculated, from which matrices the triangulation transformation matrices from each sensor's local reference system to the triangulation reference system are calculated.

18. The system according to claim 14, characterized in that the sensors only provide a bearing and/or the triangulation only takes into account provided bearings, and in that the triangulation reference system and each one of the local reference systems are planes.

19. The system according to claim 18, characterized in that the means arranged to calculate the triangulation transformation matrices from each sensor's local reference system to the triangulation system and the means arranged to calculate a corresponding bearing in the triangulation reference system involves a plane projection of each sensor location and determined bearing to the object from each respective local reference system to the triangulation reference system.

20. The system according to claim 18, characterized in that at least one of the sensors provide an elevation to the object, and in that the triangulation reference system and at least the local reference systems of the sensor that provides the elevation are three dimensional reference systems, and in that a height of the object in the triangulation reference system is determined when the object has been triangulated.

* * * * *